United States Patent
Colenbrander

(10) Patent No.: US 10,512,841 B2
(45) Date of Patent: *Dec. 24, 2019

(54) GAME STATE SAVE, TRANSFER AND RESUME FOR CLOUD GAMING

(71) Applicant: Sony Interactive Entertainment America LLC, San Mateo, CA (US)

(72) Inventor: Roelof Roderick Colenbrander, Costa Mesa, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/792,682

(22) Filed: Oct. 24, 2017

(65) Prior Publication Data

US 2018/0043256 A1 Feb. 15, 2018

Related U.S. Application Data

(63) Continuation of application No. 14/603,308, filed on Jan. 22, 2015, now Pat. No. 9,795,879.

(Continued)

(51) Int. Cl.
*A63F 13/49* (2014.01)
*A63F 13/79* (2014.01)
(Continued)

(52) U.S. Cl.
CPC ............ *A63F 13/49* (2014.09); *A63F 13/493* (2014.09); *A63F 13/79* (2014.09); *A63F 13/90* (2014.09); *A63F 13/355* (2014.09); *A63F 13/45* (2014.09); *A63F 13/497* (2014.09); *A63F 2300/554* (2013.01)

(58) Field of Classification Search
CPC ........ A63F 13/45; A63F 13/49; A63F 13/493; A63F 13/497; A63F 13/79; A63F 13/554; A63F 13/355; A63F 13/90; A63F 2300/554

See application file for complete search history.

(56) References Cited

U.S. PATENT DOCUMENTS 9,233,309 B2 * 1/2016 Gallizzi ................ A63F 13/355
9,266,022 B1 * 2/2016 Pasqualone ............ A63F 13/10
(Continued)

FOREIGN PATENT DOCUMENTS

JP 2012-234564 A 11/2012 ............ G06F 9/46
WO WO 2014/123169 A1 8/2014 ............ A63F 13/49

OTHER PUBLICATIONS

JP Application No. 2017-535361, Office Action dated Jul. 3, 2018, 5 pages.

(Continued)

*Primary Examiner* — William H McCulloch, Jr.
(74) *Attorney, Agent, or Firm* — Penilla IP, APC

(57) ABSTRACT

A system and method of pausing a game in a cloud gaming system including playing a game on a first game computer included in the cloud gaming system, pausing the game at a selected point in the game and capturing game state data for the paused game. The paused game can be resumed by retrieving the game state data and applying the game state data to a selected game computer and resuming the game at the selected point in the game on the selected game computer.

20 Claims, 5 Drawing Sheets

Related U.S. Application Data

(60) Provisional application No. 62/099,027, filed on Dec. 31, 2014.

(51) Int. Cl.
    *A63F 13/90*         (2014.01)
    *A63F 13/493*       (2014.01)
    *A63F 13/355*       (2014.01)
    *A63F 13/497*       (2014.01)
    *A63F 13/45*         (2014.01)

(56) References Cited

U.S. PATENT DOCUMENTS

| | | | |
|---|---|---|---|
| 9,332,216 B2 * | 5/2016 | Colenbrander | H04N 7/013 |
| 9,345,966 B2 * | 5/2016 | Miura | A63F 13/12 |
| 9,381,432 B2 * | 7/2016 | Justice | A63F 13/12 |
| 9,545,574 B2 * | 1/2017 | Justice | A63F 13/792 |
| 9,606,782 B2 * | 3/2017 | Chan | G06F 9/54 |
| 9,700,792 B2 * | 7/2017 | Takamura | A63F 13/35 |
| 9,795,879 B2 * | 10/2017 | Colenbrander | A63F 13/79 |
| 9,839,847 B2 * | 12/2017 | Godfrey | H04L 67/38 |
| 10,258,881 B2 * | 4/2019 | Perry | A63F 13/355 |
| 2001/0046893 A1 * | 11/2001 | Giobbi | G07F 17/32 |
| | | | 463/24 |
| 2006/0068861 A1 * | 3/2006 | Triestram | A63F 13/10 |
| | | | 463/1 |
| 2006/0148571 A1 * | 7/2006 | Hossack | A63F 13/10 |
| | | | 463/43 |
| 2008/0090650 A1 * | 4/2008 | Tarantino | A63F 3/00157 |
| | | | 463/25 |
| 2009/0094600 A1 * | 4/2009 | Sargaison | G06F 8/61 |
| | | | 717/177 |
| 2010/0167809 A1 * | 7/2010 | Perlman | A63F 13/12 |
| | | | 463/24 |
| 2011/0281645 A1 * | 11/2011 | Wolfson | A63F 13/355 |
| | | | 463/31 |
| 2013/0172070 A1 * | 7/2013 | Kim | A63F 13/493 |
| | | | 463/24 |
| 2014/0113705 A1 * | 4/2014 | Fear | A63F 13/35 |
| | | | 463/24 |
| 2014/0135105 A1 * | 5/2014 | Quan | A63F 13/10 |
| | | | 463/24 |
| 2014/0179424 A1 * | 6/2014 | Perry | A63F 13/355 |
| | | | 463/31 |
| 2014/0289194 A1 * | 9/2014 | Chan | G06F 9/54 |
| | | | 707/620 |
| 2015/0105154 A1 * | 4/2015 | Green | A63F 9/24 |
| | | | 463/31 |
| 2015/0178018 A1 * | 6/2015 | Colenbrander | G06F 3/0664 |
| | | | 711/154 |
| 2015/0199078 A1 * | 7/2015 | Pidhajecky | G06F 3/0481 |
| | | | 715/760 |
| 2015/0367238 A1 * | 12/2015 | Perrin | A63F 13/30 |
| | | | 463/29 |
| 2016/0023109 A1 * | 1/2016 | Colenbrander | A63F 13/355 |
| | | | 463/42 |
| 2016/0184712 A1 * | 6/2016 | Colenbrander | A63F 13/79 |
| | | | 463/29 |
| 2016/0256784 A1 * | 9/2016 | Schultz | A63F 13/79 |
| 2016/0259453 A1 * | 9/2016 | Colenbrander | A63F 13/53 |
| 2017/0050110 A1 * | 2/2017 | Perry | A63F 13/23 |
| 2017/0050111 A1 * | 2/2017 | Perry | A63F 13/355 |
| 2017/0065887 A1 * | 3/2017 | Colenbrander | A63F 13/355 |
| 2017/0087460 A1 * | 3/2017 | Perry | A63F 13/35 |
| 2017/0087464 A1 * | 3/2017 | Perry | A63F 13/355 |
| 2017/0087475 A1 * | 3/2017 | Perry | A63F 13/86 |
| 2017/0312626 A1 * | 11/2017 | Colenbrander | A63F 13/355 |
| 2018/0001205 A1 * | 1/2018 | Osman | A63F 13/5375 |
| 2018/0043256 A1 * | 2/2018 | Colenbrander | A63F 13/79 |
| 2019/0240572 A1 * | 8/2019 | Perry | A63F 13/355 |

OTHER PUBLICATIONS

Japanese Application No. 2017-535361, Notice of Reason(s) for Refusal, Dispatch No. 146783, dated Apr. 9, 2019.

* cited by examiner

GAME STATE SAVE, TRANSFER AND RESUME FOR CLOUD GAMING

CROSS REFERENCE TO RELATED APPLICATIONS

This application is a Continuation Application under 35 USC § 120 of U.S. application Ser. No. 14/603,308, filed on Jan. 22, 2015 (now U.S. Pat. No. 9,795,879, issued on Oct. 24, 2017), entitled "Game State Save, Transfer and Resume for Cloud Gaming," which further claims priority from U.S. Provisional Patent Application No. 62/099,027 filed on Dec. 31, 2014 and entitled "Game State Save, Transfer and Resume for Cloud Gaming," which is incorporated herein by reference in its entirety for all purposes.

FIELD OF DISCLOSURE

The present invention relates generally to cloud gaming environments, and more particularly, to systems and methods for saving a state of an on-going game at any point in the game, and resuming the game at the same point of the game at some later time.

BACKGROUND

Cloud gaming is facilitated by a system of networked servers that are accessible to users via the Internet. The servers host multiple users' gaming sessions. Typically, a user is assigned a virtual server or a physical server for hosting the user's game play. Many games are complex and may last indefinite periods of time. Often a user will pause his game to allow the user to take a break for many different reasons.

The game typically includes periodic, predefined stop points programmed into the game. For example, a predefined stop point is often at the end of each scene or level of action in a game. At these predefined stopping points, the games will save data from the game play, such as levels reached, achievements obtained, and perform other housekeeping functions. If the user wishes to play the game further, either after the stopping point or another later point in time, the game system will restart or re-launch the game, e.g., at a next level or stage. If the user wishes to pause the game, the game can be paused, but the game machine will need to stay frozen waiting for further user input. This, of course, if the user wishes to take a short break. However, if the user wishes to pause and stop playing for a while, it is inefficient and impractical for the game machine to continue spinning for hours or days, waiting for the user to resume.

The content of the game between the predefined pause points includes unique, complex, interactive, graphics and action that are unique to that user's specific instance of play. The unique, complex, interactive, graphics and action are embodied in a multitude of different, unique, game state data. Saving game play in one of the unique, complex, interactive, graphics and action points in the game is correspondingly complex and often prevented by various hardware and software version incompatibilities.

As noted above, pausing the cloud gaming server hosting the user's game play could be done, however, that unnecessarily consumes cloud gaming server time and energy and also prevents any other user from using the cloud gaming server while the paused user's game play is paused. Further, if the user never resumes his game play, the server would be dedicated to a user that is never returning. As a result, current technology limits pausing game play to the predefined stop points.

Additionally, if a user stops game play at a point in the game that is before stopping points (i.e., end of the battle, end of the level, end of the scene, etc.), game play may be reset to the last saved stop point (i.e., state before the level started). This reset erases the user's game play between the most recently passed predefined stop point.

It is in this context that embodiments of the invention arise.

SUMMARY

Broadly speaking, the present invention fills these needs by providing a system and method for pausing an on-going game, at any point in the game, and resuming the game at the same point of the game at some time in the future. The embodiments enable saving of the game state at the point of pausing. The paused game state is saved with data sufficient to reconstruct the state of the game when the user chooses to resume. While the game is paused, the game state is collected and saved to storage, such that the cloud gaming system or server is no longer storing the state in active memory or registers of the hardware. This enables freeing up the system for other game play or processing. Further, resuming of game play can occur at any time and from any remote client. When resume is desired, the user will simply select the game that was paused and the system will load the game state. Loading the game state will include generating the game state from multiple files and data structures, such that the reconstructed game state will place a machine back to the same or substantially the same state as when the game was paused.

In one embodiment, when the game is paused, the saved game state will also save a period of time prior to the time when the pause was triggered. Saving this additional amount of time will allow the user to catch up or get reintroduced to what was occurring in the game prior to pause. As will be described below, saving of the game state occurs at a time that is generally not predesigned by the game designers, so processing must be completed to collect state data from hardware registers, buffers, memory, etc., as well as software buffers, registers and files. This collection of state data will enable another cloud gaming system to resume the game play, where it was left off, after the state data is loaded in the proper hardware and software locations, so that active interactive game play can resume. It should be appreciated that the present invention can be implemented in numerous ways, including as a process, an apparatus, a system, computer readable media, or a device. Several inventive embodiments of the present invention are described below.

One embodiment discloses a cloud gaming system including the capability of pausing a game and resuming the game. The cloud gaming system including a controller, a storage device coupled to the controller and multiple game computers coupled to the controller by a network. Each of the game computers can include a hardware layer, an operating system layer and an application layer. The operating system layer being configured for interacting with the hardware layer, the operating system layer including a state manager client. The application layer is configured for interacting with at least a portion of the operating system layer and a portion of the hardware layer. The application layer including a game, the state manager client configured to capture game state data of the game computer and storing the captured game state data when the game is paused. The state manager client can also apply the game state data on the same or a different game computer and resume the game at the point the game was paused.

Another embodiment provides a method of pausing a game in a cloud gaming system. The method includes playing a game on a first game computer included in the cloud gaming system and pausing the game at a selected point in the game. A game state data is captured for the paused game. The paused game can be resumed by retrieving the game state data and applying the game state data to a selected game computer and resuming the game at the selected point in the game on the selected game computer. The game state data can also be shared among different users to allow a first user to share his game state with one or more other users.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Figure 1:
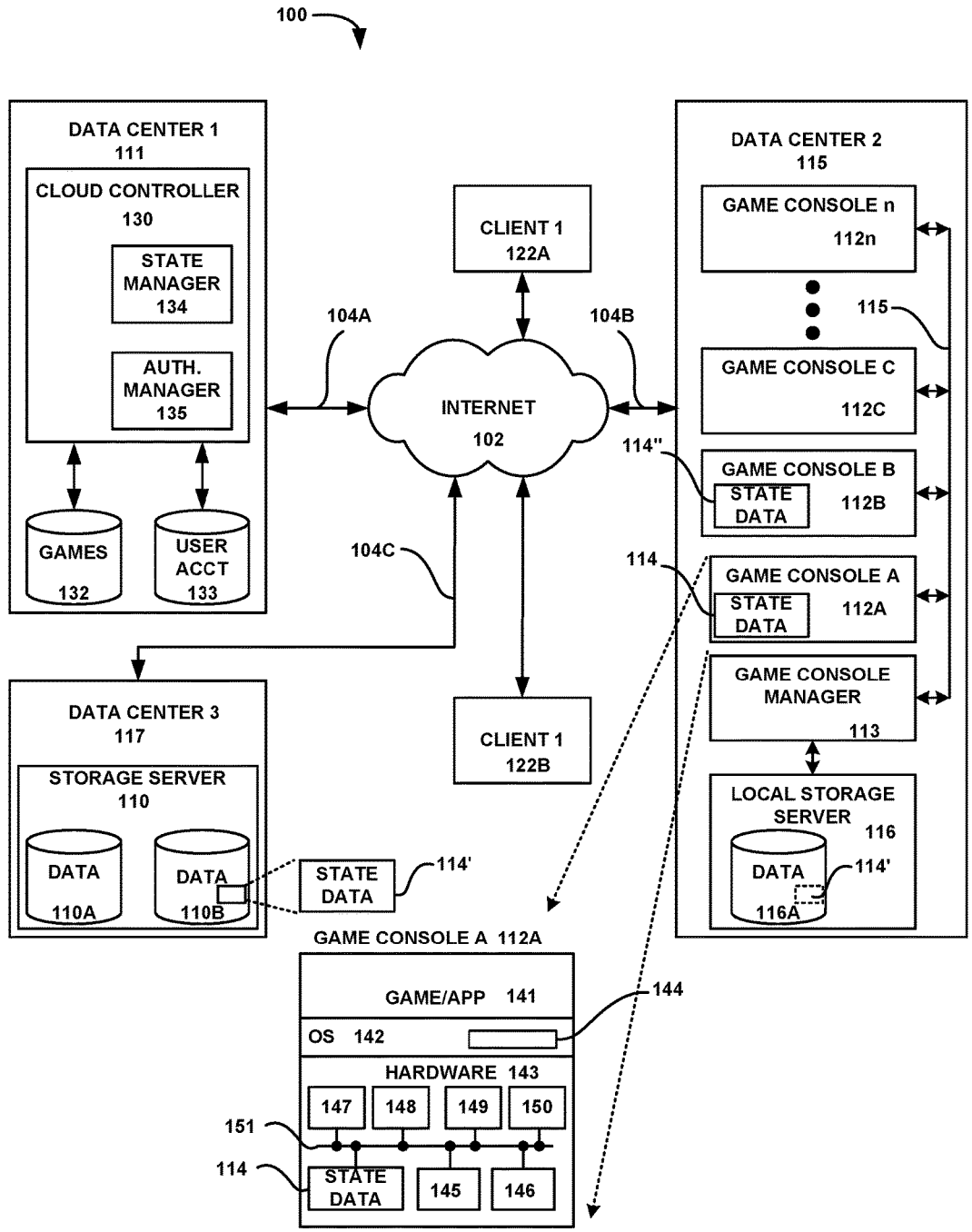
FIG. 1 is a simplified cloud gaming system, for implementing embodiments of the present disclosure.

Several exemplary embodiments for systems and methods for saving a state of an on-going game, at any point in the game, and resuming the game at the same point of the game at some time in the future will now be described. It will be apparent to those skilled in the art that the present invention may be practiced without some or all of the specific details set forth herein.

Cloud gaming is becoming very popular gaming environment. Cloud gaming allows single player and multi-player game play and also allows a user to play complex, content-rich games such as games with rich interactive content as well as immersive three-dimensional (3D) graphics. Such content rich games require complex and powerful, often very specialized computers having specialized processors, co-processors and graphics processors. Cloud gaming also requires well engineered server processes to reduce latency and monitor latency to avoid performance drops. As an added benefit, cloud gaming allows a user to play content rich games on a much simpler, client computer. As an example, a user can play games on a cloud gaming system using a tablet, a smartphone or other handheld computing device capable of communicating with the cloud gaming system via a local network and/or the Internet.

In a cloud gaming environment, just maintaining a game session open for the user to return to at some undefined moment in the future is not a viable option. Indefinitely maintaining a game session open for the user is costly for a cloud gaming provider. These costs include power usage by the cloud game computer and preventing another user from using that same game computer. In one embodiment, a cloud gaming system may assign a user a dedicated game computer (i.e., managed by a cloud gaming server), per game session. Thus, a same game computer can also be assigned to a second user when the earlier user is no longer assigned to the game computer for use. Over time, multiple users share a game computer, but they are not using the same game computer at the same point in time.

The disclosed cloud gaming state save, resume and transfer technology allows a user to pause his game play session anytime during the game play that the user chooses. Behind the scenes, the user's game state is stored and then the user's cloud game computer is freed up for another user. The cloud gaming state save, resume and transfer technology saves energy as the gaming server can transfer use of the user's assigned game computer to another user.

When the user is ready to resume his game, the user's saved game state is retrieved and loaded into the same or a different cloud game computer. The user can then resume his game play at the same point he paused it. The user can resume his game state using the same or a different client device. The user can resume his game state using the same or a different cloud gaming data center. The user can resume his game state from a geographically different part of the world.

The disclosed cloud gaming state save, resume and transfer technology has other uses as well. For example the user's gaming session could be shared among other users to allow other users to experience the same gaming session or possibly to help the other user (who may be at another remote location, but connected the cloud gaming service). As an example, a first user pauses game play, passes (e.g., shares) game state data to a second user, the second user completes a difficult fight for the first user and then pauses the game once again and passes the new game state data back to the first user. In one implementation, the user can select a share button or option on a controller or other user interface to share the saved game state. The disclosed cloud gaming state save, resume and transfer technology has many other uses as well. When the user shares the game state, the user that received the share may be assigned to another game computer by the cloud gaming system (i.e., different from the game computer of the sharing user). Before each share, the state is saved, and when the state is resumed, it may be resumed on the same game computer or another, depending on which game computer the user is assigned from time to time.

FIG. 1 is a simplified cloud gaming system 100, for implementing embodiments of the present disclosure. The cloud gaming system 100 includes a controller 130, multiple game consoles 112A-n (e.g., computers), one or more game console managers 113 and a storage server 110. The cloud controller 130 (e.g., controller), the multiple game consoles 112A-n, the one or more game console managers 113 and the storage server 110 can be located in one or more data centers 111, 115, 117. The cloud controller 130, the multiple game consoles 112A-n and the storage server 110 are coupled together by local area networks 104A, 104B, 104C and/or the Internet 102. The multiple game consoles 112A-n and the game console manager 113 can be co-located in a single data center 115 or distributed among more than one data centers.

One or more game console managers 113 can be included in each rack of game consoles 112A-n. The game console managers 113 manage one or more game consoles 112A-n depending on one or more hardware and/or software architectures. The game console managers 113 are physically connected to the game consoles 112A-n using a network connection 115 and/or an optional general purpose input/output, a universal serial bus or an equivalent control connection for activating power to a game console. The game console manager 113 can optionally include additional roles such as setting up and managing a streaming session between the assigned game console and the user's client device.

A local storage server 116 could optionally be co-located in the same data center 115 with one or more of the multiple game consoles 112A-n. The local storage server 116 can store data 116A to be used by or received from the multiple game consoles 112A-n and/or the cloud controller 130. The data centers 111, 115, 117 can be separated geographically. By way of example, the first data center 111 and the third data center 117 can be located in Los Angeles, Calif. and the second data center 115 can be located in Stockholm, Sweden.

The cloud controller 130 and/or the game console manager 113 includes a games database 132 for storing multiple games and other applications that may be downloaded to one of more of the multiple game consoles 112A-n. The cloud controller 130 also includes an authorization manager 135. The authorization manager 135 determines if a first user has a valid account and the authorized access to the cloud gaming system 100. The first user's account information is included in a user account database 133. In one or more implementations, the cloud controller 130 can also include a state manager 134. The state manager 134 can also work with a state manager client 144 included in each of the game consoles 112A-n to capture the game state data for the respective game console, when initiated.

The storage server 110 provides storage facilities for the cloud gaming system 100. The storage server 110 includes one or more storage devices 110A, 110B for storing data such as a user's state data 114', as may be required by the cloud gaming system 100. The one or more storage devices 110A, 110B can be any suitable storage media, e.g., hard disk drive, solid state drive, or optical drive, etc.

Each of the game consoles 112A-n includes a hardware layer 143 and an operating system layer 142 overlying the hardware layer. An application layer 141 overlays the operating system layer 142. The application layer 141 includes games and other application that are run on the game console 112A. The hardware layer includes a main processor 145, a co-processor 146, a graphics processor (GPU) 147, a memory system 148, an input output system 149, a network interface card 150 and many other physical peripherals and virtual peripherals that may be required for the operations of the game console 112A. The main processor 145, the co-processor 146, the graphics processor 147, the memory system 148, the input output system 149, the network interface card 150 and other peripherals are coupled together by one or more data buses 151.

In at least one implementation, the operations system layer 142 includes a state manager client 144. In other implementations the state manager client 144 could be included in one or more applications in the application layer 141. The state manager client 144 could also be implemented having portions residing in both the operations system layer 142 and the application layer 141. The state manager client 144 can capture game state data 114 of the game console 112A, when initiated. The captured game state data 114 can be stored as game state data 114' in a local storage server 116 and/or in the storage server 110. The storage location of the stored game state data 114' is provided to the cloud controller to add to the first user's account information in the user account database 133.

The client devices 122A, 122B provide access to the cloud gaming system 100 via the Internet 102 or a local network 104A-C. The client devices 122A, 122B can be any suitable platform capable of accessing the Internet 102 and/or a local network 104A-C. By way of example, the client devices 122A, 122B can be a personal computer, laptop computer, a notebook computer, a handheld gaming device, a handheld computing device such as a tablet computer or a smart telephone or any other suitable computing platform. The first client computing device 122A and the second client computing device 122B can be used in multiple different, geographically disparate locations. By way of example, the first client computing device 122A can be a tablet computer used to access the Internet 102 and the cloud gaming system 100 by the first user at his home, in his office and while he is travelling. Similarly, the second client computing device 122B can be a notebook computer capable of accessing the Internet 102 and the cloud gaming system 100 in a home, in an office or other locations having Internet access.

In one implementation, a first user can use the first client computing device 122A to access the cloud controller 130 via the Internet 102. The authentication manager 135 authenticates the first user and determines the access level allowed for the first user. The cloud controller 130 and/or the game console manager 113 assigns the first user to the game console A 112A for the present cloud gaming session and provides the authorized level of access including the authorized applications and games from the games and application database 132. The cloud controller 130 and/or the game console manager 113 may also transfer the authorized games and other applications to the assigned game console A 112A from the games and applications database 132. In one implementation, the assigned game console A 112A can access the games and applications database 132 to transfer the authorized games and other applications to the assigned game console A.

The disclosed cloud gaming state save, resume and transfer technology is especially useful for cloud gaming purposes because there is a large amount of data involved in pausing and restoring the game state. Cloud gaming systems 100 are well suited to the disclosed cloud gaming state save, resume and transfer technology, because cloud gaming systems include thousands of cloud gaming consoles 112A-n connected all around the world using high-speed networks 104A-C.

Multiple implementations of the cloud gaming state save, resume and transfer technology and methods are disclosed herein. One approach is transferring at least one of a full hardware state data or a full application state data, between game consoles. The following is a description of how the cloud gaming state save, resume and transfer mechanism can work. A detailed description of how to make a copy of the hardware state data and application state data is also provided.

Figure 2A:
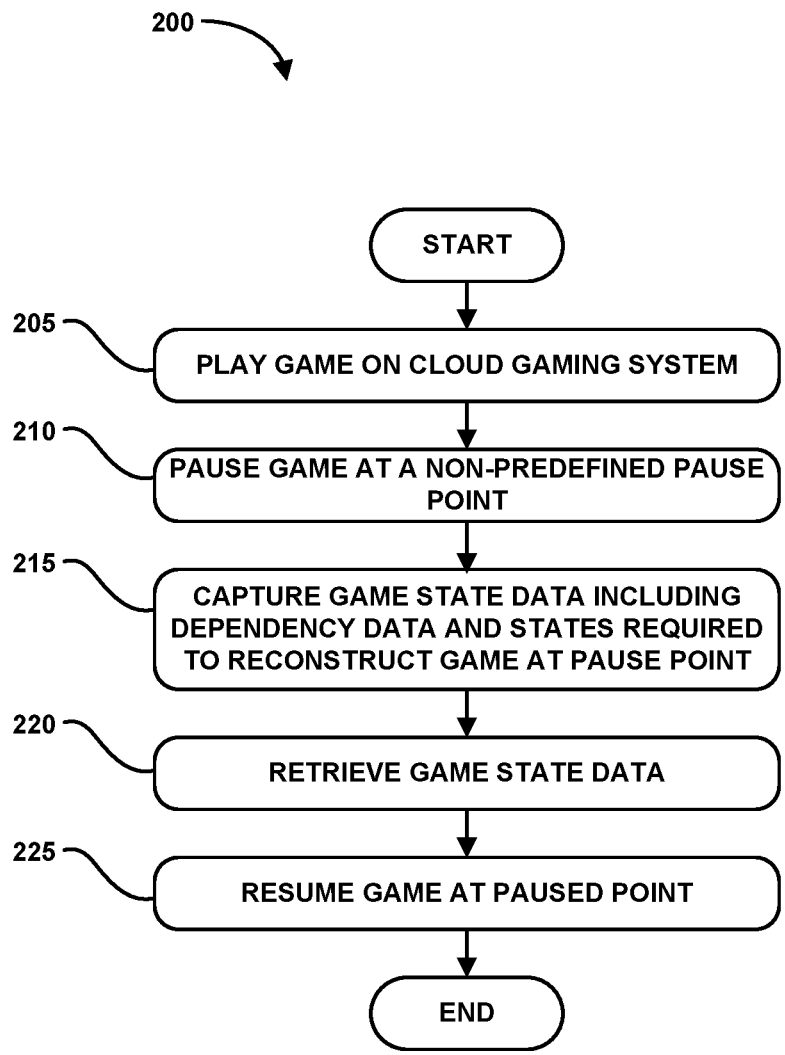
FIG. 2A is a flowchart diagram that illustrates a simplified overview of the method operations performed in the cloud gaming state save, resume and transfer mechanism, for implementing embodiments of the present disclosure

Cloud gaming state save, resume and transfer mechanism allows the transfer of game state data from one game console to another game console. FIG. 2A is a flowchart diagram that illustrates a simplified overview of the method operations 200 performed in the cloud gaming state save, resume and transfer mechanism, for implementing embodiments of the present disclosure. In an operation 205, a first user is playing a game on a game console 112A in a cloud gaming system 100. In an operation 210, the first user opts to pause the game at a selected pause point in the game. The selected pause point can be any point in the game other than a predefined game pause point. The cloud gaming system 100 may also automatically pause the user's game for one or more cloud gaming system management reasons. By way of example, if the cloud controller 130 detects no activity from the first user for a period of time longer than a predetermined inactivity time limit or if the cloud controller detects a network disconnect from the first user's client device 112A.

In one embodiment, the cloud controller has knowledge of available games and available game servers but due to capacity reasons, typically relies on the streaming software in the assigned game console and or the game console manager to handle continuous interaction with the client devices 112A-B. The game console manager, the assigned game console or the client device can determine inactivity. Inactivity by the user can be determined by the client device such as no button presses for a predefined time duration. The game console manager and/or the assigned game console can similarly identify inactivity by the user. By way of example, when the client device detects inactivity by the user for the predefined time duration, the client device sends a disconnect message to the assigned game console and/or the game console manager. The disconnect message may also include a reason for the disconnect message e.g., no user activity. When the assigned game console and/or the game console manager receives the disconnect message, processes to shutdown the remainder of the streaming session, such as stop the game, store user data, capture game state data, etc. are initiated. In one implementation, the disconnect message is received by the streaming software in the assigned game console and/or in the game console manager and the streaming software issues a shutdown message to the game console manager and the game console manager handles the shutdown process.

The user disconnect ultimately may also be communicated to the cloud controller depending on the architecture. In one embodiment, the cloud controller can monitor or track whether a user is currently streaming or not (e.g. for billing purposes) or to prevent the user from streaming multiple times which could cause data corruption if the user access his saved data from two or more locations.

The first user's game state data is captured and stored in an operation 215. The game console 112A can be freed up for a second user's use after the first user's game state data is captured and stored. The game state data includes hardware state data and/or application state data. The game state data may also include historical dependency data and process data that may be necessary to reconstruct the game at the selected pause point of the game. The historical dependency data and process data can be in the form of a data structure including temporal metadata and user interactive historical metadata required to form an executable gaming application capable of resuming at the selected pause point. Examples of temporal metadata and user interactive historical metadata include graphics data such as color data, texture data, vertex data, fragmentation data, art assets, drawing data, shading data, lighting data and more. The temporal metadata and user interactive historical metadata can also include contents and states of various buffers and caches and the status of various counters and timers necessary to coordinate the operation of the game. Capturing the game state data can also include capturing a current image of the scene in the game at the first user's selected pause point.

At some later time, in an operation 220, the first user opts to resume the paused game and the stored first user's game state data is retrieved and loaded on an assigned game console and the game is resumed at the paused point in the game in an operation 225. The user can resume the game on the same game console 112A as originally the user originally used with the game. Alternatively, the first user can resume the game on another game console 112B. The first user can also authorize the second user to access the first user's game state data to allow the second user to resume the first user's paused game. Resuming the game includes applying the game state data on the selected game console. The game state data can include a data structure including temporal metadata and user interactive historical metadata required to form an executable gaming application capable of resuming at the selected pause point.

Figure 2B:
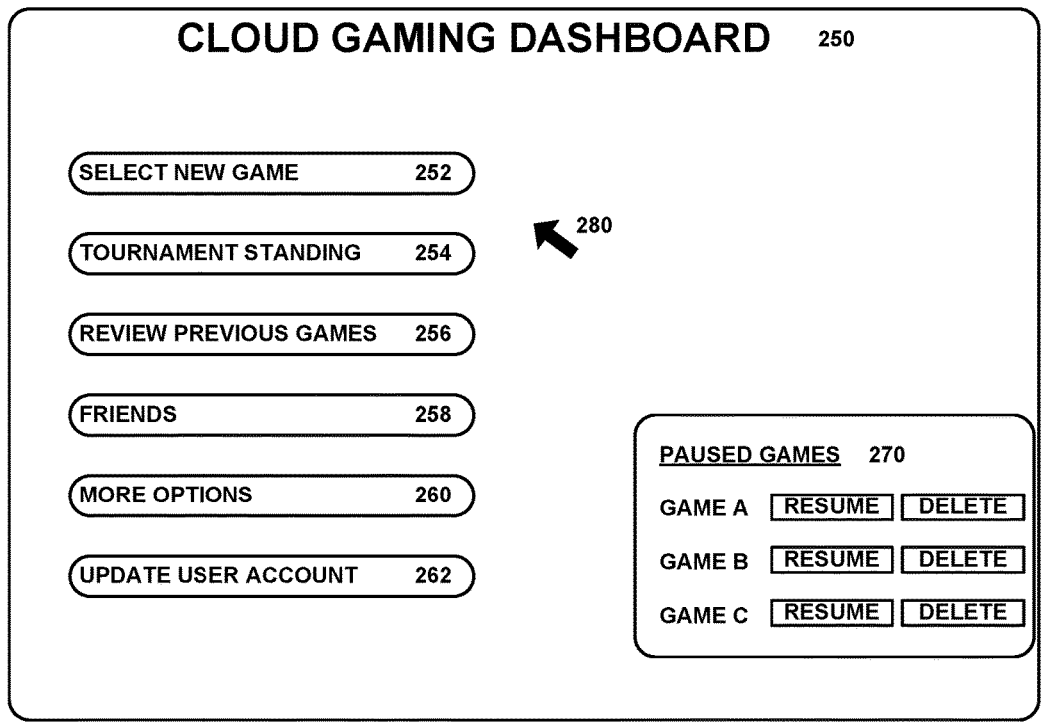
FIG. 2B is a simplified graphical user interface of a user's cloud gaming system dashboard, for implementing embodiments of the present disclosure.

FIG. 2B is a simplified graphical user interface of a user's cloud gaming system dashboard 250, for implementing embodiments of the present disclosure. The cloud gaming system dashboard 250 includes options to select a new game 252, research the user's current standing in a gaming tournament 254, review user's gaming history 256, update user's friends 258, other options 260 and update user account 262. Each of the options moves the user to a corresponding screen for performing the selected option.

The cloud gaming system dashboard 250 can also include a paused game menu 270. The paused game menu 270 includes a list of paused games and options to resume or delete the paused games. It should be noted that the user can have more than one paused games and can pause a game at any time and for any reason he chooses. A pointer 280 for selecting the displayed menu options is also shown in the cloud gaming system dashboard 250 screen.

Cloud gaming state save, resume and transfer provides the capture and allows transfer of a user's game state from one game console to another game console. The user's game state can include one or both of the hardware state data and/or the application state data of the user's gaming console at the time the user pauses the game.

Figure 2C:
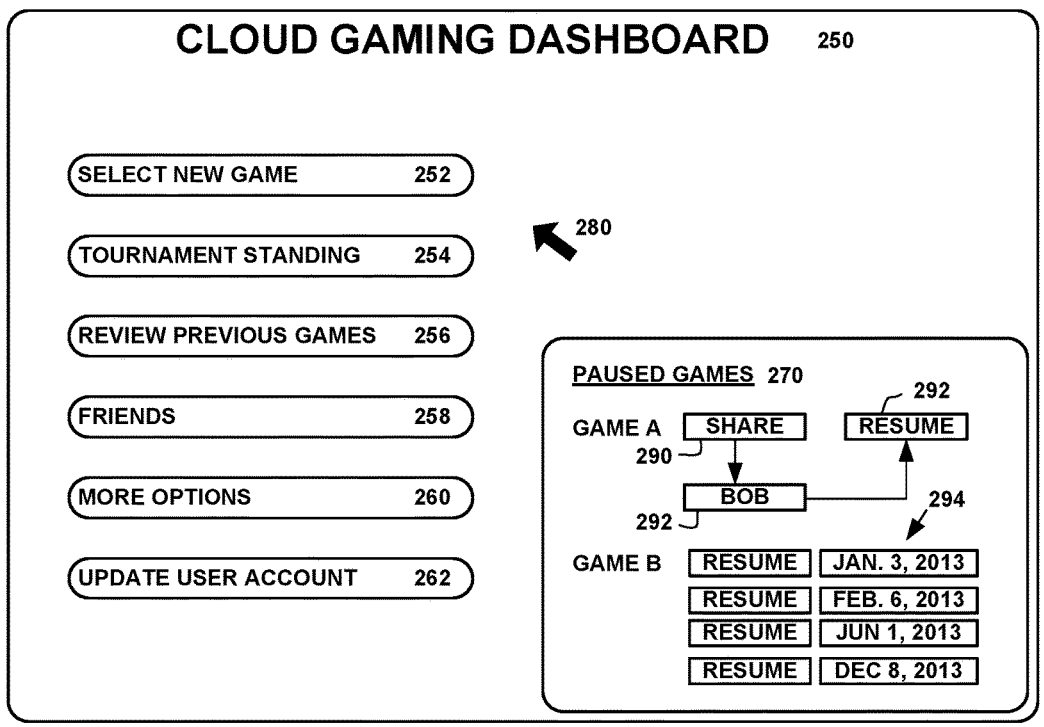
FIG. 2C illustrates an example where the user is provided the functionality to share and save resume points, for implementing embodiments of the present disclosure.

FIG. 2C illustrates an example where the user is provided the functionality to share 290 a saved state of game A. The system may also save data that the user saved the game state with Bob 292, and is then provided with the ability to resume 292 from some saved pause point or state made by Bob. It is also possible for Bob to complete a level and save or indicate back to the user that the level is complete, which would enable re-starting of a next level. Further shown in FIG. 2C is the option to save historical information 294 of paused points in game B. If the user pauses several times, it is possible for the user to resume at these earlier pause points, instead of only the last saved pause point. In some embodiments, a certain number of pause points are saved for historical purposes to save on storage space or the user may be provided with the ability to download saved pause points. Further, a user may be able to share a pause point with more than one user. For example, a user may share a paused point in game A with multiple users (e.g., friends) to see who scores the best in a level, achieves the best trophies, etc. Then, the user can select which friends pause point he or she wishes to take over from or resume from.

Figure 3:
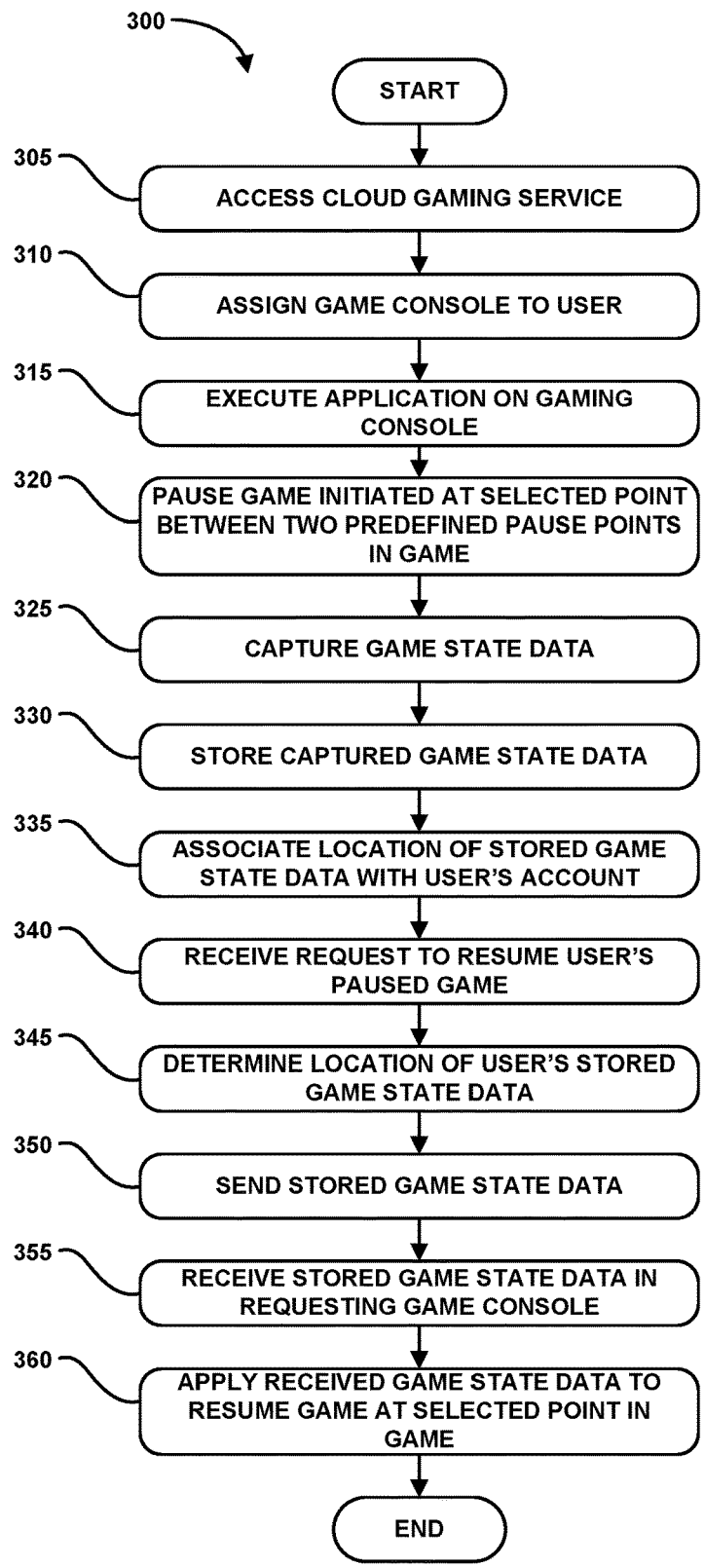
FIG. 3 is a flowchart diagram that illustrates the method operations performed in the cloud gaming state save, resume and transfer, for implementing embodiments of the present disclosure.

FIG. 3 is a flowchart diagram that illustrates the method operations 300 performed in the cloud gaming state save, resume and transfer, for implementing embodiments of the present disclosure. In an operation 305, a first user accesses a cloud gaming system cloud controller 130. The authorization manager 135 confirms the user has a valid account and the first user's authorized access by querying the user account database 133 and comparing the first user's login access information to the first user's account information in the user account data base 133. The first user can access the cloud controller via a client device 122A.

The cloud controller 130 assigns the first user to a game console 112A, in an operation 310. In one implementation, assigning the first user to a game console 112A can include automatically loading any of the first user's previously paused games on the assigned game console 112A. Assigning the game console 112A to the first user can also include displaying the first user's cloud gaming system dashboard 250 screen. In one implementation the game console manager can assign the first user to a game console 112A. The cloud controller performs the authorization and the game console manager activates the game console (e.g., apply power), transfers any needed data such as game data, user data, game state data, etc., and trigger a login sequence to the assigned game console. Alternatively, the assigned game console can retrieve any needed data such as game data, user data, game state data, etc. from the corresponding storage locations as indicated by the user data and/or the game console manager and/or the cloud controller 130.

In an operation 315, the first user selects and executes a game or an application on the assigned game console 112A. The assigned game console 112A can be one of many game consoles in one or more cloud gaming servers. In one implementation, the first user's assigned game console 112A can be limited to a timeshare of a game console, where the first user is allocated only a portion of the operating time of the assigned game console 112A. The game console 112A can provide one or more timeshares, each of the timeshares can be assigned to respective user, thus allowing multiple users to use a single game console at the same time.

In an operation 320, a pause is initiated in the game at a point other than a predefined pause point in the application. For example, the first user could initiate the pause request to pause his streaming game session. Alternatively, the cloud controller 130 can initiate the pause due to inactivity by the first user that exceeds a preselected inactivity time limit. For cost reasons, the cloud controller 130 can automatically pause the first user's game console 112A so that the first user's game console can be freed up and made available to a second user. The first user can initiate the pause by communicating the pause request to one or both of the cloud controller 130 and the first user's assigned game console 112A. As noted above, the pause operations may be distributed among the assigned game console, the game console manager, the cloud controller 130 and the streaming software.

In an operation 325, the first user's current game state data 114 of the assigned game console 112A is captured. The captured first user's game state data 114 can be hardware state data or application state data or both hardware state data and application state data. The hardware state data and application state data and methods and systems for capturing the hardware state data and application state data are described in more detail below.

In an operation 330, the captured first user's game state data 114 is stored for later retrieval. As described above, the captured first user's game state data 114 can be stored as stored game state data 114' in the local storage server 116 and/or in the storage server 110. The storage server 110 and the local storage server 116 can efficiently store game state data for multiple game consoles and/or multiple users. In an operation 335, the location of the first user's stored game state data 114' is associated with the first user's account data in the user account data base 133. This allows the first user's account information to include the storage location of the first user's paused game state data.

At some later time, and in an operation 340, a request to resume the first user's paused game at the point it was paused in operation 320 above, is initiated. The resume request can originate from the first user or an authorized second user. The first user or an authorized second user can issue the resume request through an assigned game console such as game console 112B.

If the first user had logged off his initial gaming session or his initial gaming session was otherwise interrupted such as the cloud controller terminating the initial gaming session or the first user experiencing an interruption in the network connection to the cloud gaming server 130 or to the game console manager 113 or to the assigned game console, then the first user may be required to re-access the cloud gaming service and be assigned a game console, as described in operation 305 above. When the first user is assigned a game console 112B, one or more of the first user's paused games may be automatically loaded on the assigned game console. When the first user is assigned a game console 112B and one of the first user's paused games is loaded on the assigned game console, the assigned game console may provide an indication to the first user that the paused game is ready to resume and provide access for the first user to resume the paused game, at the point the game was paused in operation 320 above.

The first user can also share, or send the stored game state data 114' or otherwise authorize access to the stored state game data 114' to the second user as described above. The request to resume the game is received in the cloud controller 130 from an assigned game console, e.g., game console 112B.

Upon receiving the resume request, the cloud controller 130 queries the first user's account information in the user account database 133 to determine the storage location of the stored first user's game state data 114' for the user's paused game, in an operation 345. The cloud controller 130 and/or the game console manager 113 can retrieve the stored first user's game state data 114' and send the stored first user's game state data 114' to the requesting game console 112B, in an operation 250. In an operation 355, the requesting game console 112B receives the stored first user's game state data 114'.

In an operation 360, the requesting game console 112B applies the stored first user's game state data 114' to produce resumed game state data 114" to reconstruct the game at the paused point. Reconstructing the game at the paused point configures the requesting game console 112B to the equivalent configuration as the game console 112A and the game to when the game was paused in operation 320 above.

Reconstructing the game at the paused point can include populating multiple respective aspects and locations within the requesting game console 112B with the respective portions of the resumed game state data. By way of example, reconstructing the game at the paused point can include populating all historical dependency data and process data that may be necessary to reconstruct the game at the point the game was paused. Examples of dependency data and process data necessary to reconstruct the game include graphics data such as color data, texture data, vertex data, fragmentation data, art assets, drawing data, shading data, lighting data and more. The dependency data and process data can also include contents and states of various buffers and caches and the status of various counters and timers necessary to coordinate the operation of the game. Reconstructing the game at the point the game was paused can also include displaying a captured image of the scene in the game at the first user's selected pause point.

In an operation 370, the first user's game is resumed in game console 112B, at the same point in the game as was paused, in operation 320 above, and the method operations can end.

Game state data can be expressed in the form of an application state data and/or a hardware state data. Each of the application state data and hardware state data capture and resume has its own challenges for the cloud gaming state save, resume and transfer technology, as discussed below.

Application State Data

A computer is a piece of hardware composed of one or more processors, memory and input output peripherals like a graphics processor unit (GPU), a sound card, a keyboard and other peripherals. The tasks the computer runs are computer programs or applications. The computer processors execute these applications' code and make decisions based on the I/O, e.g. a keyboard button press can result in an output of the video frame on a display.

The application state data can be attributed to the hardware state data. The memory buffers the application uses are ultimately areas of a RAM chip or in a swap file, e.g. a hard disk drive or a solid state drive. The processor stores the instructions for the application in instruction caches and retrieves/stores data in processor registers, data caches or RAM. During execution, each computer application has a corresponding application state data. The application state data is in the form of:
Open file handles
Network connections in the form of open sockets
Pipes
State of memory buffers used by the application
Instruction counters
Timers As an example, the application state data can include signals, threads, file descriptors, virtual memory mappings, thread local storage, threads, process IDs, user IDs, group IDs, pipes, sockets and more. The application state data can also include operating system level concepts such as GPU resources occupied by the game. The game is aware of resources such as textures, geometry buffers, shader instructions for the GPU to execute, and others. Textures are stored in GPU memory, shader instructions are loaded into GPU memory and in an instruction cache during execution and there is ultimately a matching instruction pointer.

Referring again to FIG. 3 above, the game or application is suspended when the pause is initiated in operation 320 of FIG. 3 above. In operation 325, the game state data is captured by capturing the application state data. The application state data includes virtual memory mappings, retrieve file descriptors, etc. In one implementation, a debugger-like functionality from within the application can be used to capture the virtual memory mappings, retrieve file descriptors etc.

A portion of the application state data can also be obtained from the outside on a Linux operating system e.g. from /proc/<proccess id>application. An example of application state data could be an open file, for which the application has a file descriptor, which is numerical value. The numerical value file descriptor is used in file read/write calls as an identifier for the file. In order to restore this state, the application needs to be provided with the correct numerical value file descriptor. By way of example, in a Linux operating system the numerical value file descriptor can be captured by pseudo code such as:
original_file_descriptor=42
file_descriptor=open("/path/to/file", . . . )
dup2(file_descriptor, original_file_descriptor)

Also on a Linux operating system other types of application state data such as process IDs (PIDs), user id, group ids, network layout and others can be virtualized using name spaces. The virtualized process IDs (PIDs), user ID, group IDs, network layout, etc., allow creation of sandbox/container environments, in which portions of the system can be hidden and in which PIDs, user IDs and other operating system level resources can be recreated.

The captured application state data can then be used to re-create an identical application state data on the same or a different computer system, e.g., game console 112B, in operation 360 of FIG. 3. The various application state data can be placed in the respective locations in the game console 112B being used to resume the application or game. Content of the network buffers can be recreated in the operating system. Alternatively, the network buffers can be drained to a safe recovery point, similar to the hardware interrupts described below. In this manner the user would be able to resume the application at the point the application or game was paused in operation 320 above.

Hardware State Data

Hardware state data includes the operational conditions of a computer that us paused during execution of an application, such as when the user chooses to pause the application. The current operational conditions of the computer are frozen in time so that the computer's hardware, e.g., processors, RAM, all the peripherals, GPU, sound card, network card . . . etc. Capturing this hardware state data and then applying the captured hardware state data to another computer can allow the user to resume the application where the user had paused the application in the first computer.

An emulator is an application that mimics a computer's hardware completely in software. Emulators are often used to run legacy applications from a very old computer or game console, such as an obsolete computer or game console, on a more recently produced computer system. The more recently produced computer system is incompatible with the legacy applications due to hardware incompatibilities and without the emulator application, the more recently produced computer system is unable to run the legacy applications.

In order to save hardware state data at any selected point in the operation, the emulator can save the emulated hardware state data for the emulated computer e.g. to a file. The emulated hardware state data includes capturing all the memory for the emulated devices, state of peripherals, storing the address of the currently executed instruction in others for the emulated computer. The emulated computer is realized completely in the emulator application, thus capturing the application state data of the emulator application, as described above.

A virtual machine state is similar to an emulated hardware state data. In the context of cloud gaming, a hardware state data capture, transfer and resume, one challenge for emulators is sharing the emulated hardware state data between multiple, virtual game machines.

Typically, server applications, e.g. a web server, a database server, an email server, etc., are run on a physical server hardware, e.g., a server machine. The server machine includes a powerful central processing unit (CPU) and a large amount of memory, which allows running multiple server applications in parallel. Computer hardware such as processors, memory, data buses, etc., have become more powerful and server uptime and security has become even more critical and important.

Server applications typically run on a virtualized server hardware. In such an instance, there is a powerful server processor, which runs a virtualization application. The virtualization application allows for the creation of multiple virtual machines. Each virtual machine is a separately operating, emulated computer hardware. Each virtual machine includes its own set of virtual or physical peripherals, e.g., network cards, storage devices, etc. Each virtual machine can run its own operating system. The operating system on each of the virtual machines can be different the other virtual machines and different from the operating system of the physical machine e.g. a Linux physical machine running multiple virtual machines, each of the virtual machines running different versions of Windows or other suitable computer operating systems.

Each server application, e.g. web server, database server, email server, etc. is typically assigned to its own virtual machine for security isolation reasons. In general, virtual machines, like emulators, are software concepts, and can be paused in a way similar to emulators and the virtual machine state can be captured as application state data of the virtualization application.

The virtual machine state can then be transferred to a second virtual machine. The second virtual machine can be running on a different physical server potentially using different physical components but the physical components will not matter due to the virtual peripheral devices and the virtual machine's virtual processor.

The virtual machine state can be considered a type of application state data. Transferring the virtual machine state between computer systems is called migration of virtual machines and is a common feature in the server world.

A recent extension to migration of virtual machines is referred to as live migration and improves server reliability. For example, a virtual database server may detect that the physical hardware is failing, e.g., memory errors, hard disk read errors, etc., and trigger a migration of the virtual database server to another, identical virtual database server hosted on a different server hardware. The live migration can occur with only a few milliseconds or less of downtime and without disconnecting any clients.

Unfortunately, all peripherals of the virtual machine must be virtual peripherals for migration of the virtual machine to function correctly. Migration of the virtual machine does not support migration of physical peripherals. Migrating the hardware state data of a first game console to a second game console requires migrating physical hardware and thus the virtual machine migration is unsuitable for this purpose.

The game consoles cannot easily or efficiently be emulated or virtualized due to the complexity required of the game console hardware to produce the content rich, interactive gaming environment. The user is assigned to a specific game console and the user's selected game is being executed by the hardware of the assigned game console. Thus the emulation and virtualization will not provide the needed functionality for capturing hardware state data as a type of application state data.

As described above, hardware migration requires capturing the relevant hardware state data of the computer and the peripherals for that computer. The device drivers for the respective peripherals can be queried to capture the relevant hardware state data for the peripherals and storing such state in system memory when the system is going into hibernation. When the system is powered on again all memory state is restored from disk and peripheral device drivers would also be instructed to restore any hardware state data e.g. buffers containing 3D textures for the GPU.

In one implementation, the game console 112A includes a main processor 145 and a coprocessor 146, as shown in FIG. 1 above. When the user opts to pause the game console 112A, in operation 320 above, the main processor 145 can freeze one or more of the current operation(s). In the operation 325, the coprocessor 146 can query the main processor 145, buffers, the graphics processor 147, the memory system 148, the input output system 149, the network interface card 150 and other peripherals to determine the respective present states to capture the hardware state data. Alternatively, an application working with or as part of the operating system can pause and query the buffers, graphics processor 147, the memory system 148, the input output system 149, the network interface card 150 and other peripherals.

To support game console hardware state data migration from a first game console 112A to a second game console 112B requires extra measures, even if the second game console 112B includes the same components and peripherals as the first game console 112A. For example, peripherals in each of the game consoles 112A, 112B will have different internal serial numbers, which may require some reconfiguration. Another example would be the MAC address of a network device which would require additional reconfiguration.

Further, the second game console 112B can be in a different network environment than the first game console 112A. The different network environment is likely using different network settings and thus the game console hardware state data migration would also require network out reconfiguration. Game console hardware state data migration may also be required to be reconfigured for geographic differences between the first game console 112A and the second game console 112B. As an example, transfer to the second game console 112B in a different geographic region than the first game console 112A may require time zone changes, language changes and possibly even changes to the language used in a running game.

The second game console 112B may also be have a different hardware revision than the first game console 112A, which may require different re-initialization. For example the second game console 112B may be a newer hardware revision, e.g. at a smaller semiconductor process, may be more power efficient and would need different power and cooling settings than the first game console 112A.

Live migration of single applications is a fairly new area. One approach allows pausing an application, followed by capturing the application state data such as file handles, sockets, memory state, and other types of application state data, such as described above. During resume, the identical file descriptors are restored to the same condition as when the application was paused. The network connections, timers, mutual exclusions and other types of states are also restored. A 3D game application relies on hardware state data in the form of buffers residing on a GPU. The previous approach does not capture the respective hardware state data and would be required for application state data transfer of 3D games. In this context hardware state data refers to any data or state stored in hardware on behalf of the application. For example, buffers in GPU memory containing geometry or texture data, memory buffers containing game data files on a hard disk. The application typically accesses such hardware state data through software abstraction layers provided by an operating system kernel or device drivers. Examples of such abstractions can be file descriptors to a file on a disk is ultimately a layer on top of the storage device, file descriptors representing GPU side buffers and graphics contexts. Sometimes, for performance reasons, the application may directly access hardware buffers. Directly accessing hardware buffers may be guided by a device driver.

One approach to capturing hardware state data includes pausing the application to and the software abstractions linked to the paused hardware state data would be captured. If the software abstraction mechanism is a file descriptor, the file descriptor can be used to look up corresponding hardware state data. Since the file descriptors are often a device driver/OS kernel concept, the corresponding device driver needs to expose a method for retrieving its associated hardware state data. The process of identifying all hardware state data behind the back of the application can be quite difficult Examples of hardware state data includes content of various registers, fifo buffers, instruction caches (in both CPU and GPU), data caches (CPU/GPU), RAM, program counter(s)/instruction pointer(s) on CPU and GPU. The GPU instructions would be for shader applications.

The hardware state data also includes transitional state related information. For example hardware may issue an interrupt signal. The interrupt signal can be regenerated or the buffer can drain the current content of the buffer and then reload the buffer in a known safe recover state. In one implementation the hardware can be allowed to finish any queued or scheduled operations. Interrupts can then be used to trigger new operations or to notify completion or an operation. If the hardware is busy with operations, such interrupt signals can be re-generated else the hardware may not complete an operation on resume in case the hardware was waiting for an interrupt signal for some pending operation. Some operations may have fewer transitional states to capture. In one implementation, the game operations can be continued until the pending transitional states are minimized or below a selected threshold then less transitional hardware state data such as interrupts and instruction counters may be needed for the reconstruction during resuming the game.

Another approach is to get assistance from the application. Instead of pausing the application, the application could be sent a suspend signal, which makes the application store all its internal state to disk and which allows it to recover any needed hardware state data. Upon resuming the application, it is the application's job to do the recovery. The advantage is that the application knows what hardware state data it really needs to capture. A significant portion of the hardware state data can likely recover by reloading data from its game files. The game may also handle recovery e.g. drop network connection to online cloud controller.

Figure 4:
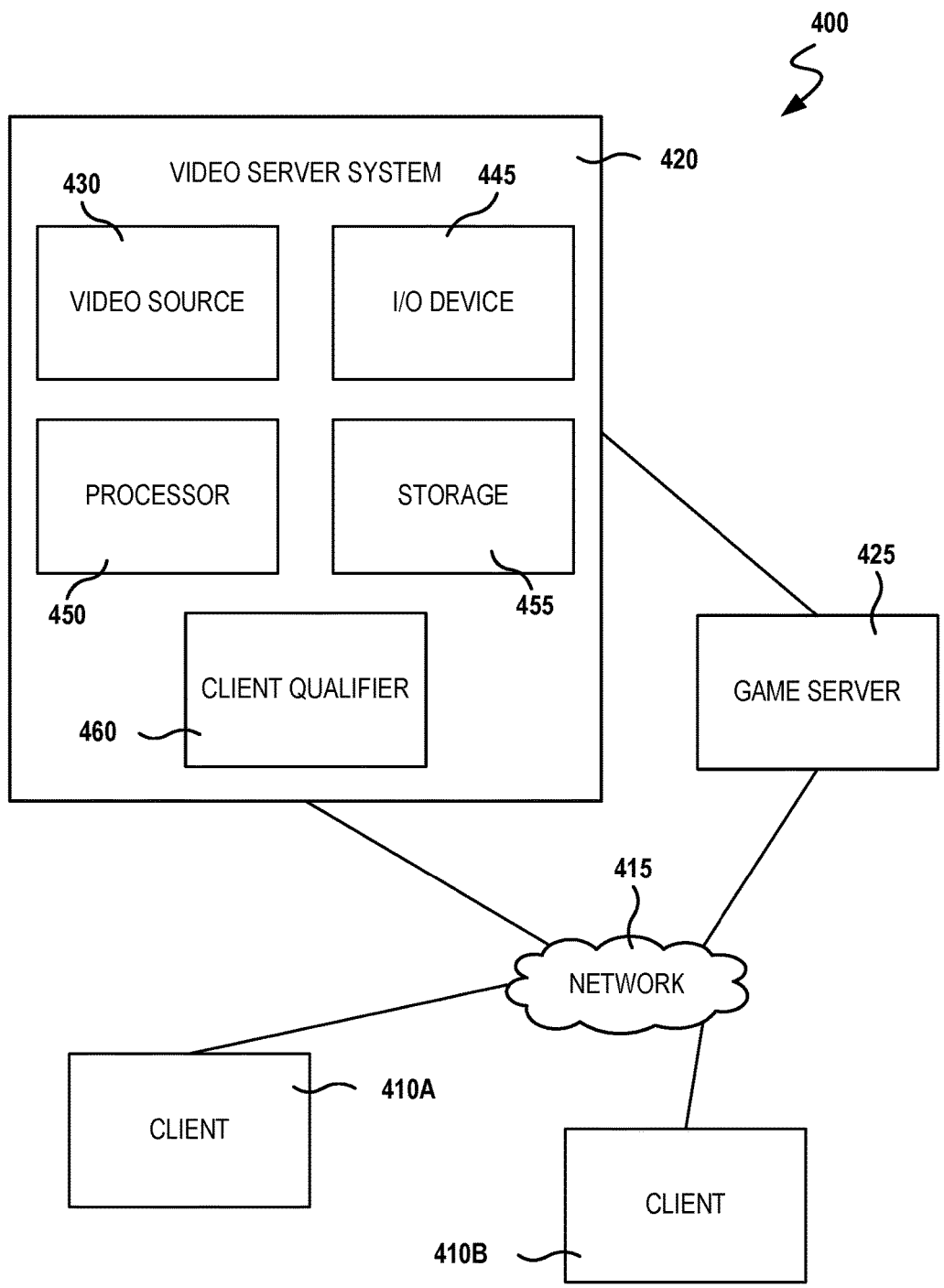
FIG. 4 is a block diagram of a Game System, according to various embodiments of the invention.

Independent of the recovery via transfer of application state data or hardware state data, there are additional resume aspects including an online game disconnect, adjusting for time zone of the user and the game console, selecting an appropriate language for the user and resuming the game timer. Games often use high precision always increasing timers, for internal game timing. After resume, these timers need to be restarted at exactly the same time as they were at before suspend else the game may make wrong decisions, e.g. a game character could be stuck in a wall or die. Depending on the operating system which may or may not handle this yet, software changes are needed. As described above, in operation 350 et seq., the correct application or game and all the supporting data files are needed for a successful resume FIG. 4 is a block diagram of a Game System 400, according to various embodiments of the invention. Game System 400 is configured to provide a video stream to one or more Clients 410 via a Network 415. Game System 400 typically includes a Video Server System 420 and an optional game server 425. Video Server System 420 is configured to provide the video stream to the one or more Clients 410 with a minimal quality of service. For example, Video Server System 420 may receive a game command that changes the state of or a point of view within a video game, and provide Clients 410 with an updated video stream reflecting this change in state with minimal lag time. The Video Server System 420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 420 frames per second. Although higher or lower frame rates are included in alternative embodiments of the invention.

Clients 410, referred to herein individually as 410A., 410B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 410 or on a separate device such as a monitor or television. Clients 410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 410 are optionally geographically dispersed. The number of clients included in Game System 400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 420 to deliver a game viewed through the HMD. In one embodiment, the game console receives the video stream from the video server system 420, and the game console forwards the video stream, or updates to the video stream, to the HMD for rendering.

Clients 410 are configured to receive video streams via Network 415. Network 415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 410 may, but are not required to, further include systems configured for modifying received video. For example, a client may be configured to perform further rendering, to overlay one video image on another video image, to crop a video image, and/or the like. For example, Clients 410 may be configured to receive various types of video frames, such as I-frames, P-frames and B-frames, and to process these frames into images for display to a user. In some embodiments, a member of Clients 410 is configured to perform further rendering, shading, conversion to 3-D, or like operations on the video stream. A member of Clients 410 is optionally configured to receive more than one audio or video stream. Input devices of Clients 410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 410 is generated and provided by Video Server System 420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 410 are typically configured to receive inputs from a user. These inputs may include game commands configured to change the state of the video game or otherwise affect game play. The game commands can be received using input devices and/or may be automatically generated by computing instructions executing on Clients 410. The received game commands are communicated from Clients 410 via Network 415 to Video Server System 420 and/or Game Server 425. For example, in some embodiments, the game commands are communicated to Game Server 425 via Video Server System 420. In some embodiments, separate copies of the game commands are communicated from Clients 410 to Game Server 425 and Video Server System 420. The communication of game commands is optionally dependent on the identity of the command Game commands are optionally communicated from Client 410A through a different route or communication channel that that used to provide audio or video streams to Client 410A. It should be understood that the game server 425 can include portions of the cloud controller 130 and/or the game manager 113 as described above.

Game Server 425 is optionally operated by a different entity than Video Server System 420. For example, Game Server 425 may be operated by the publisher of a multiplayer game. In this example, Video Server System 420 is optionally viewed as a client by Game Server 425 and optionally configured to appear from the point of view of Game Server 425 to be a prior art client executing a prior art game engine. Communication between Video Server System 420 and Game Server 425 optionally occurs via Network 415. As such, Game Server 425 can be a prior art multiplayer game server that sends game state information to multiple clients, one of which is game server system 420. Video Server System 420 may be configured to communicate with multiple instances of Game Server 425 at the same time. For example, Video Server System 420 can be configured to provide a plurality of different video games to different users. Each of these different video games may be supported by a different Game Server 425 and/or published by different entities. In some embodiments, several geographically distributed instances of Video Server System 420 are configured to provide game video to a plurality of different users. Each of these instances of Video Server System 420 may be in communication with the same instance of Game Server 425. Communication between Video Server System 420 and one or more Game Server 425 optionally occurs via a dedicated communication channel. For example, Video Server System 420 may be connected to Game Server 425 via a high bandwidth channel that is dedicated to communication between these two systems.

Video Server System 420 comprises at least a Video Source 430, an I/O Device 445, a Processor 450, and non-transitory Storage 455. Video Server System 420 may include one computing device or be distributed among a plurality of computing devices. These computing devices are optionally connected via a communications system such as a local area network.

Video Source 430 is configured to provide a video stream, e.g., streaming video or a series of video frames that form a moving picture. In some embodiments, Video Source 430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 425. Game Server 425 may maintain a copy of the state of the game based on game commands received from multiple players using geographically disperse clients. In these cases, the game state is provided by Game Server 425 to Video Source 430, wherein a copy of the game state is stored and rendering is performed. Game Server 425 may receive game commands directly from Clients 410 via Network 415, and/or may receive game commands via Video Server System 420.

Video Source 430 typically includes rendering logic, e.g., hardware, firmware, and/or software stored on a computer readable medium such as Storage 455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 430 includes a video recording device such as a camera. This camera may be used to generate delayed or live video that can be included in the video stream of a computer game. The resulting video stream, optionally includes both rendered images and images recorded using a still or video camera. Video Source 430 may also include storage devices configured to store previously recorded video to be included in a video stream. Video Source 430 may also include motion or positioning sensing devices configured to detect motion or position of an object, e.g., person, and logic configured to determine a game state or produce video-based on the detected motion and/or position.

Video Source 430 is optionally configured to provide overlays configured to be placed on other video. For example, these overlays may include a command interface, log in instructions, messages to a game player, images of other game players, video feeds of other game players (e.g., webcam video). In embodiments of Client 410A including a touch screen interface or a gaze detection interface, the overlay may include a virtual keyboard, joystick, touch pad, and/or the like. In one example of an overlay a player's voice is overlaid on an audio stream. Video Source 430 optionally further includes one or more audio sources.

In embodiments wherein Video Server System 420 is configured to maintain the game state based on input from more than one player, each player may have a different point of view comprising a position and direction of view. Video Source 430 is optionally configured to provide a separate video stream for each player based on their point of view. Further, Video Source 430 may be configured to provide a different frame size, frame data size, and/or encoding to each of Client 410. Video Source 430 is optionally configured to provide 3-D video.

I/O Device 445 is configured for Video Server System 420 to send and/or receive information such as video, commands, requests for information, a game state, gaze information, device motion, device location, user motion, client identities, player identities, game commands, security information, audio, and/or the like. I/O Device 445 typically includes communication hardware such as a network card or modem. I/O Device 445 is configured to communicate with Game Server 425, Network 415, and/or Clients 410.

Processor 450 is configured to execute logic, e.g. software, included within the various components of Video Server System 420 discussed herein. For example, Processor 450 may be programmed with software instructions in order to perform the functions of Video Source 430, Game Server 425, and/or a Client Qualifier 460. Video Server System 420 optionally includes more than one instance of Processor 450. Processor 450 may also be programmed with software instructions in order to execute commands received by Video Server System 420, or to coordinate the operation of the various elements of Game System 400 discussed herein. Processor 450 may include one or more hardware device. Processor 450 is an electronic processor.

Storage 455 includes non-transitory analog and/or digital storage devices. For example, Storage 455 may include an analog storage device configured to store video frames. Storage 455 may include a computer readable digital storage, e.g. a hard drive, an optical drive, or solid state storage. Storage 415 is configured (e.g. by way of an appropriate data structure or file system) to store video frames, artificial frames, a video stream including both video frames and artificial frames, audio frame, an audio stream, and/or the like. Storage 455 is optionally distributed among a plurality of devices. In some embodiments, Storage 455 is configured to store the software components of Video Source 430 discussed elsewhere herein. These components may be stored in a format ready to be provisioned when needed.

Video Server System 420 optionally further comprises Client Qualifier 460. Client Qualifier 460 is configured for remotely determining the capabilities of a client, such as Clients 410A or 410B. These capabilities can include both the capabilities of Client 410A itself as well as the capabilities of one or more communication channels between Client 410A and Video Server System 420. For example, Client Qualifier 460 may be configured to test a communication channel through Network 415.

Client Qualifier 460 can determine (e.g., discover) the capabilities of Client 410A manually or automatically. Manual determination includes communicating with a user of Client 410A and asking the user to provide capabilities. For example, in some embodiments, Client Qualifier 460 is configured to display images, text, and/or the like within a browser of Client 410A. In one embodiment, Client 410A is an HMD that includes a browser. In another embodiment, client 410A is a game console having a browser, which may be displayed on the HMD. The displayed objects request that the user enter information such as operating system, processor, video decoder type, type of network connection, display resolution, etc. of Client 410A. The information entered by the user is communicated back to Client Qualifier 460.

Automatic determination may occur, for example, by execution of an agent on Client 410A and/or by sending test video to Client 410A. The agent may comprise computing instructions, such as java script, embedded in a web page or installed as an add-on. The agent is optionally provided by Client Qualifier 460. In various embodiments, the agent can find out processing power of Client 410A, decoding and display capabilities of Client 410A, lag time reliability and bandwidth of communication channels between Client 410A and Video Server System 420, a display type of Client 410A, firewalls present on Client 410A, hardware of Client 410A, software executing on Client 410A, registry entries within Client 410A, and/or the like.

Client Qualifier 460 includes hardware, firmware, and/or software stored on a computer readable medium. Client Qualifier 460 is optionally disposed on a computing device separate from one or more other elements of Video Server System 420. For example, in some embodiments, Client Qualifier 460 is configured to determine the characteristics of communication channels between Clients 410 and more than one instance of Video Server System 420. In these embodiments the information discovered by Client Qualifier can be used to determine which instance of Video Server System 420 is best suited for delivery of streaming video to one of Clients 410.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A cloud gaming system comprising:
a controller;
a storage device coupled to the controller;
a plurality of game computers coupled to the controller by a network, each one of the plurality of game computers including:
a hardware layer;
an operating system layer configured for interacting with the hardware layer, the operating system layer including a state manager client;
an application layer configured for interacting with at least a portion of the operating system layer and a portion of the hardware layer, the application layer including a gaming application, the state manager client configured to capture game state data of the game computer and storing the captured game state data when the gaming application is paused at a selected pause point, wherein the selected paused point is not a predefined stopping point, wherein the game state data is used to recreate an executable state for the game capable of resuming at the selected pause point.

2. The cloud gaming system of claim 1, wherein the state manager client is further configured to apply the stored, captured game state data to the game computer to resume the gaming application at the point the gaming application was paused, wherein resuming the game includes applying game state data to the game computer to produce an executable gaming application.

3. The cloud gaming system of claim 1, wherein the game state data includes a data structure including temporal metadata and user interactive historical metadata to recreate the executable state for the game.

4. The cloud gaming system of claim 3, further comprising account data having a listing of a paused gaming application for a selected user of a plurality of users and a storage location of the game data for the paused gaming application.

5. The cloud gaming system of claim 4, wherein the controller includes an authentication manager configured to determine an authorized access for the selected user.

6. The cloud gaming system of claim 1, wherein the hardware layer of each one of the plurality of game computers includes:
a processor; and
a graphics processor coupled to the processor by a data bus.

7. The cloud gaming system of claim 6, wherein the hardware layer of each one of the plurality of game computers further includes a co-processor coupled to the data bus and wherein the co-processor of each one of the plurality of game computers is configured to capture game state data.

8. The cloud gaming system of claim 1, wherein the controller and a first portion of the plurality of game computers are disposed in a first data center.

9. The cloud gaming system of claim 8, wherein the storage device coupled to the controller is included in a storage server and wherein the controller is disposed in the first data center and the storage server is disposed in a third data center.

10. The cloud gaming system of claim 1, wherein the game state data includes at least one of a hardware state data or an application state data.

11. A method for pausing a game in a cloud gaming system comprising:
receiving a gaming request from a first client device, the gaming request being received by a controller in a cloud gaming system;
assigning the first client device to a first game computer in the cloud gaming system;
receiving an game execution request from the first client device;
executing the game on the first game computer;

receiving a request to pause the game at a selected pause point, the request to pause being received from the first client device, the selected pause point is not a pre-defined stop point;

pausing the game on the first game computer at the selected pause point in the game; and capturing a game state data for the paused game on the first game computer, wherein the game state data is used to recreate an executable state for the game capable of resuming at the selected pause point.

12. The method of claim 11, wherein the first game computer captures the game state data to enable the first game computer to terminate execution of the game so that the first game computer is available to be assigned to another user.

13. The method of claim 11, wherein the game state data includes a data structure including temporal metadata and user interactive historical metadata.

14. The method of claim 11, wherein resuming the resuming the game at the selected pause point capable of occurring at any one of the first game computer or another game computer.

15. The method of claim 11, further comprising:

retrieving the game state data and applying the game state data to a selected game computer, the selected game computer included in the cloud gaming system; and resuming the game at the selected point in the game.

16. The method of claim 15, wherein applying the game state data to the selected game computer includes populating respective locations in the selected game computer with respective portions of the game state data, and wherein the selected game computer is a second game computer.

17. The method of claim 11, wherein capturing the game state data includes capturing at least one of an application state data or a hardware state data.

18. The method of claim 11, wherein capturing the game state data includes storing the game state data and updating a corresponding user account information with a storage location of the stored game state data.

19. The method of claim 11, further comprising:

receiving an authentication request from a first user, the authentication request being received in the controller;

determining an authorized access for the first user; and wherein assigning the first client device to the first game computer includes assigning the first user to the first game computer, loading a paused game state data in the first game computer when the first user's user account data includes the paused game and a location of the game state data.

20. The method of claim 11, further comprising:

receiving an authentication request from a first user, the authentication request being received in the controller;

determining an authorized access for the first user, wherein assigning the first client device to the first game computer includes assigning the first user to the first game computer; and retrieving game state data when the first user's user account data includes the paused game and the location of the game state data;

receiving a game state share request in the controller, wherein the game state share request is received from the first user and wherein the game state share request is a request to share the first user's game state data with a second user;

sharing the game state data with a second game computer assigned to the second user.

* * * * *